(12) United States Patent
Guillemin et al.

(10) Patent No.: US 11,421,651 B2
(45) Date of Patent: Aug. 23, 2022

(54) METHOD OF DETERMINING WIND DIRECTION BY MEANS OF A LIDAR SENSOR

(71) Applicant: IFP Energies nouvelles, Rueil-Malmaison (FR)

(72) Inventors: Fabrice Guillemin, Rueil-Malmaison (FR); Hoai-Nam Nguyen, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 17/173,103

(22) Filed: Feb. 10, 2021

(65) Prior Publication Data

US 2021/0277867 A1    Sep. 9, 2021

(30) Foreign Application Priority Data

Feb. 10, 2020    (FR) ..................... 20/01.278

(51) Int. Cl.
*F03D 7/02*    (2006.01)
*G01S 17/95*    (2006.01)
*G01P 5/26*    (2006.01)

(52) U.S. Cl.
CPC ............ *F03D 7/0204* (2013.01); *G01S 17/95* (2013.01); *F05B 2270/321* (2013.01); *F05B 2270/8042* (2013.01); *G01P 5/26* (2013.01)

(58) Field of Classification Search
CPC ... F03D 7/0204; F05B 2270/321; G01S 17/95
See application file for complete search history.

(56) References Cited

U.S. PATENT DOCUMENTS

2011/0084871 A1*  4/2011  Haykin ................ G01S 7/4008
                                                            342/90
2020/0124026 A1*  4/2020  Nguyen ................ G01S 17/58

FOREIGN PATENT DOCUMENTS

CN    107063245 A  *  8/2017  .......... G01C 21/005
EP    2 581 762 A1    4/2013
WO    2018/234409 A1    12/2018

OTHER PUBLICATIONS

EPO Search Opinion dated Jun. 17, 2021 and Reply filed Dec. 2, 2021 in App21 154 246.9, Including partial English translation (Year: 2021).*
Preliminary Search Report for FR 20 01 278, dated Oct. 14, 2020 (2 pages).

(Continued)

*Primary Examiner* — Topaz L. Elliott
(74) *Attorney, Agent, or Firm* — Fitch, Even, Tabin & Flannery LLP

(57) ABSTRACT

The present invention relates to a method of determining the direction of the wind by a LiDAR sensor (2). This method comprises performing measurements by the LiDAR sensor (2), deducing a Gaussian distribution of the longitudinal (u) and transverse (v) components of the wind speed, and determining wind direction (θ) by a spherical cubature approximation method and of the Gaussian distribution of the longitudinal and transverse components of the wind speed.

19 Claims, 3 Drawing Sheets

(56) References Cited

OTHER PUBLICATIONS

Ienkaran Arasaratnam: "Cubature Kalman Filtering: Theory & Applications", Apr. 1, 2009 (Apr. 1, 2009), pp. 1-150, XP055736914, Extra it de I 'Internet: URL:https://macsphere.mcmaster.ca/bitstream/11375/17242/1/Arasaratnam%20Ienkaran.pdf [extrait le Oct. 6, 2020].

P. Towers et al: "Real-time wind field reconstruction from LiDAR measurements using a dynamic wind model and state estimation : LiDAR wind field estimation", WI ND ENERGY,vol. 19, No. 1,Nov. 21, 2014 (Nov. 21, 2014), pp. 133-150, XP055451329,GBISSN: 1095-4244, DOI: 10.1002/we.1824.

* cited by examiner

[Fig 1]
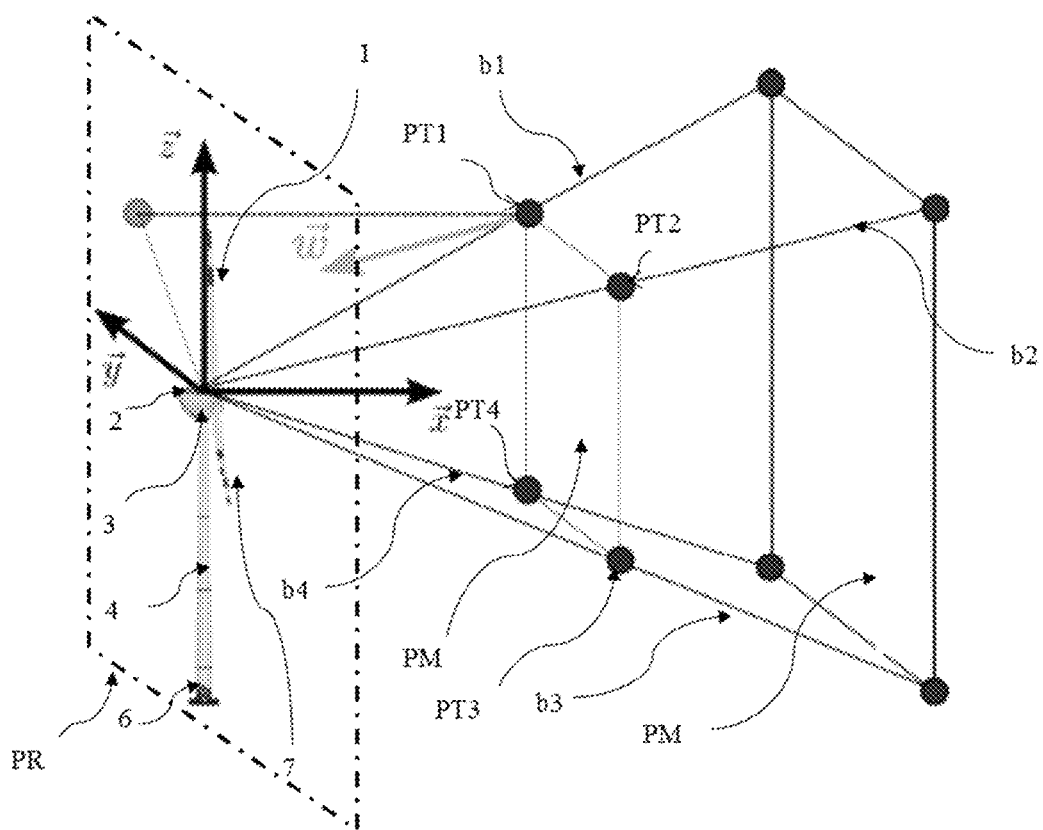
[Fig 2]

[Fig 3]
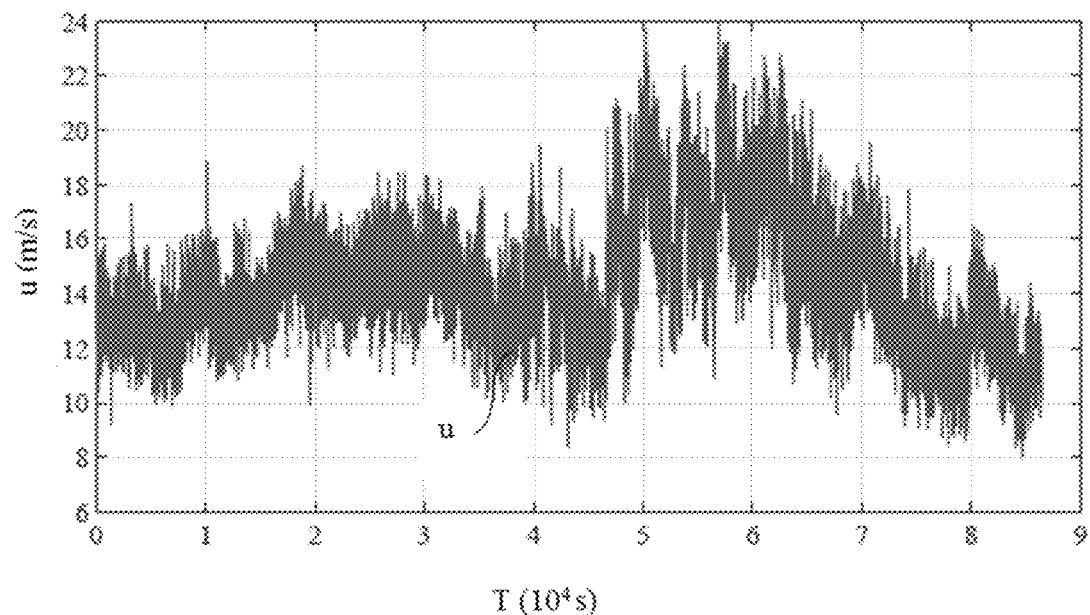
[Fig 4]
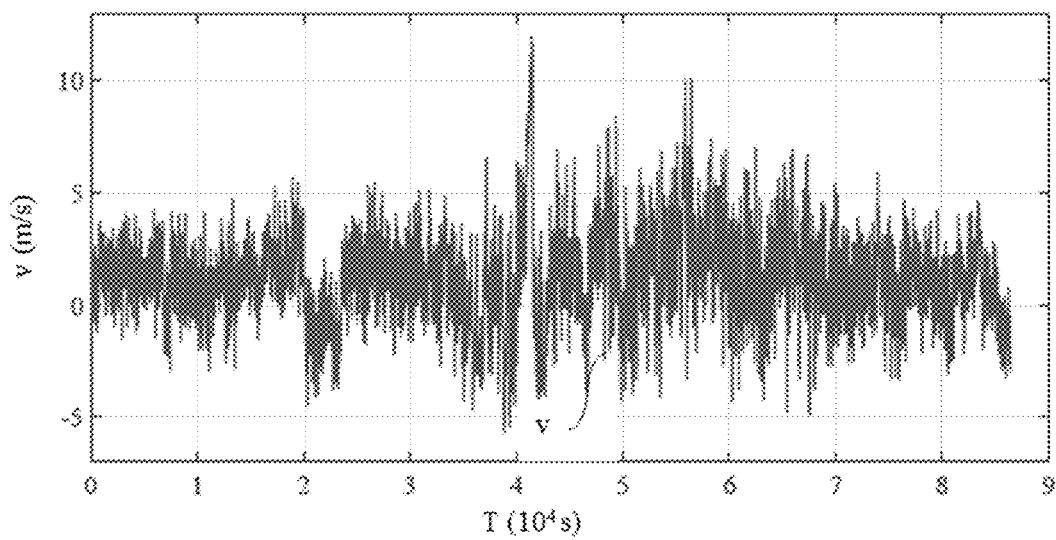

[Fig 5]
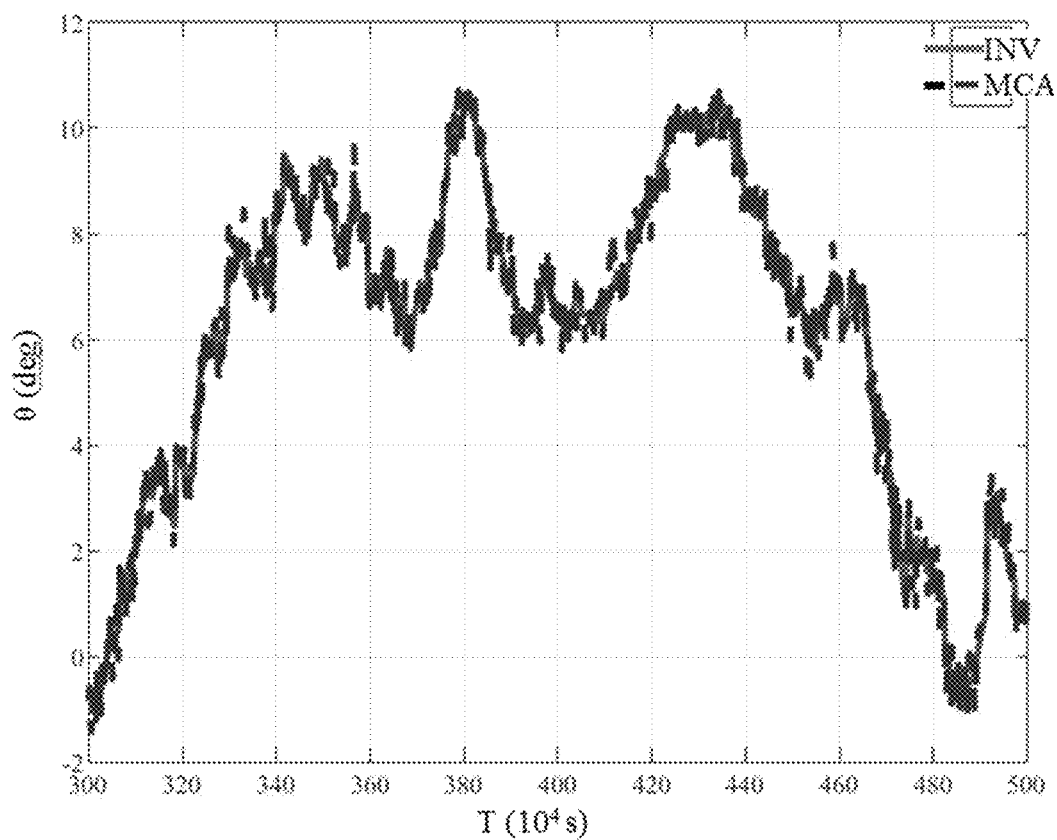

METHOD OF DETERMINING WIND DIRECTION BY MEANS OF A LIDAR SENSOR

CROSS-REFERENCE TO RELATED APPLICATIONS

This application claims priority to French Patent Application No. 20/01.278, filed Feb. 10, 2020, the contents of which are incorporated herein by reference in their entirety.

BACKGROUND OF THE INVENTION

Field of the Invention

The present invention relates to the field of renewable energies and more particularly to the measurement of the resource of wind turbines, the wind, with wind prediction, turbine control (orientation, torque and speed regulation) and/or diagnosis and/or monitoring objectives.

Description of the Prior Art

A wind turbine allows the kinetic energy from the wind to be converted into electrical or mechanical energy. For wind energy conversion, it is made up of the following elements:

a tower allowing a rotor to be positioned at a sufficient height to enable motion thereof (necessary for horizontal-axis wind turbines) or the rotor to be positioned at a height enabling it to be driven by a stronger and more regular wind than at ground level. The tower generally houses part of the electrical and electronic components (modulator, control, multiplier, generator, etc.), a nacelle mounted at the top of the tower, housing mechanical, pneumatic and some electrical and electronic components necessary to operate the turbine. The nacelle can rotate to orient the rotor in the right direction, a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electrical machine (electrical generator) or to any other type of conversion machine that converts the energy recovered to electrical energy or any type of energy. The rotor is potentially provided with control systems such as a variable-angle blades or aerodynamic brakes, a transmission having two shafts (mechanical shaft of the rotor and mechanical shaft of the conversion machine) connected by a transmission (gearbox).

Since the beginning of the 1990s, there has been renewed interest in wind power, in particular in the European Union where the annual growth rate is about 20%. This growth is attributed to the inherent possibility for carbon-emission-free electricity generation. In order to sustain this growth, the energy yield of wind turbines still needs to be further improved. The prospect of wind power production increase requires developing effective production tools and advanced control tools in order to improve the performances of the machines. Wind turbines are designed to produce electricity at the lowest possible cost. They are therefore generally built to reach their maximum performance at a wind speed of approximately 15 m/s. It is not necessary to design wind turbines that maximize their yield at higher wind speeds, which are not common. In case of wind speeds above 15 m/s, it is necessary to lose part of the additional energy contained in the wind to avoid damage to the wind turbine. All wind turbines are therefore designed with a power regulation system.

For this power regulation, controllers have been designed for variable-speed aerogenerators. The purpose of the controllers is to maximize the electrical power recovered, to minimize the rotor speed fluctuations, and to minimize the fatigue and the extreme moments of the structure (blades, tower and platform).

To optimize control, it is important to know the wind speed at the rotor of the wind turbine. Various techniques have been developed to that end.

According to a first technique, using an anemometer allows estimation of a wind speed at one point, but this imprecise technology does not enable measurement of an entire wind field or to know the three-dimensional components of the wind speed, or the wind direction.

According to a second technique, a LiDAR (Light Detection And Ranging) sensor can be used. LIDAR is a remote sensing or optical measurement technology based on the analysis of the properties of a beam returned to the emitter. This method is notably used for determining the distance to an object by use of a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are announced as essential for proper functioning of large wind turbines, especially now that their size and power is increasing (today 5 MW, soon 12 MW for offshore turbines). LIDAR sensor enable remote wind measurements, first allowing wind turbines to be calibrated so that they can deliver maximum power (power curve optimization). For this calibration stage, the sensor can be positioned on the ground and vertically oriented (profiler), which allows measurement of the wind speed and direction, as well as the wind gradient depending on the altitude. This application is particularly critical because it allows knowing the energy generating resource. This is important for wind turbine projects since it conditions the financial viability of the project. However, this method may be expensive as it requires a LiDAR sensor fixedly installed on the ground or in the water and vertically oriented, in addition to the LiDAR sensor provided on the wind turbine for the application described below.

A second application sets the sensor on the nacelle of the wind turbine in order to measure the wind field in front of the turbine while being nearly horizontally oriented. A priori, measuring the wind field in front of the turbine allows knowing in advance the turbulence the wind turbine is going to encounter shortly thereafter. However, current wind turbine control and monitoring techniques do not allow accounting for of a measurement performed by a LiDAR sensor by estimating precisely the wind speed at the rotor, that is in the rotor plane. Such an application is notably described in French patent application FR-3-013,777 corresponding to US-2015-145,253.

Since such a LiDAR sensor has only been developed relatively recently, it is still difficult to know, by converting raw data from the LiDAR sensor, how to exploit the wind field characteristics, such as wind speed, wind direction, wind shear, turbulence, induction factor, etc. In particular, determining the wind direction is important for control and diagnosis of the wind turbine. This wind direction determination needs to be reliable, robust and in real time.

SUMMARY OF THE INVENTION

The purpose of the method according to the invention determines the wind direction in a reliable and robust manner, and in real time. The present invention therefore relates to a method of determining the wind direction by use of a LiDAR sensor. This method comprises performing measurements by use of the LiDAR sensor, deducing therefrom a Gaussian distribution of the longitudinal and transverse components of the wind speed, and determining the wind direction by use of a spherical cubature approximation method and of the Gaussian distribution of the longitudinal and transverse components of the wind speed. The spherical cubature approximation method allows determination of the wind direction in real time because it is fast, it does not require many calculations and it does not involve complex calculations, unlike the Monte Carlo method that is not suitable for real-time estimation problems.

The invention relates to a method of determining the wind direction by use of a LiDAR sensor on a wind turbine, wherein the following steps are carried out:

a) performing wind measurements by a LiDAR sensor in at least one measurement plane upstream from the wind turbine, the measurement plane being perpendicular to the measurement direction of the LiDAR sensor, b) determining a Gaussian distribution of the longitudinal and transverse components of the wind speed by use of the measurements, the longitudinal component corresponding to the measurement direction of the LiDAR sensor, and the transverse component corresponding to a direction perpendicular to the measurement direction of the LiDAR sensor; and c) determining in real time the wind direction by use of the determined Gaussian distribution of the longitudinal and transverse components of the wind speed through a spherical cubature approximation method.

According to an embodiment of the invention, the Gaussian distribution of the longitudinal and transverse components of the wind speed is determined by use of a wind field estimator.

Advantageously, the method further determines the standard deviation of the wind direction.

According to an implementation, the spherical cubature approximation involves five stochastic realizations from the Gaussian distribution of the longitudinal and transverse components of the wind speed.

According to an aspect, the wind direction is determined by use of the spherical cubature approximation method by carrying out the following steps:

i) determining stochastic realizations of the Gaussian distribution of the longitudinal $u_j$ and transverse $v_j$ components of the wind speed, with j ranging from −2 to 2, so that:

$$\begin{cases} \begin{bmatrix} u_0(k) \\ v_0(k) \end{bmatrix} = \begin{bmatrix} \hat{u}(k) \\ \hat{v}(k) \end{bmatrix}, \\ \begin{bmatrix} u_{\pm 1}(k) \\ v_{\pm 1}(k) \end{bmatrix} = \begin{bmatrix} \hat{u}(k) \\ \hat{v}(k) \end{bmatrix} \pm \sqrt{2}\,\delta_1 S_1, \\ \begin{bmatrix} u_{\pm 2}(k) \\ v_{\pm 2}(k) \end{bmatrix} = \begin{bmatrix} \hat{u}(k) \\ \hat{v}(k) \end{bmatrix} \pm \sqrt{2}\,\delta_2 S_2, \end{cases}$$

with $$\Sigma = \begin{bmatrix} \delta_1^2 & 0 \\ 0 & \delta_2^2 \end{bmatrix},$$

$$P(k) = S\Sigma S^T,$$

$$P(k) = \delta_1^2 S_1 S_1^T + \delta_2^2 S_2 S_2^T,$$

$\hat{u}$ and $\hat{v}$ are the estimated values of u and v, P(k) is covariance matrix of the Gaussian distribution, S and Σ the matrices obtained from the singular value decomposition of covariance matrix P(k), $S_1$ and $S_2$ being the columns of matrix S, ii) for each stochastic realization j, determining wind direction $\theta_j$ by use of the equation:

$$\theta_j(k) = \arctan\left(\frac{v_j(k)}{u_j(k)}\right),$$

and iii) determining wind direction B by use of the following equation:

$$\hat{\theta}(k) = \sum_{j=-2}^{2} w_j \theta_j(k),$$

with $\omega_j$ weightings of the stochastic realizations.

Preferably, standard deviation $\hat{\sigma}$ of the wind direction $\hat{\theta}$ is determined by use of the following equation:

$$\hat{\sigma}(k) = \sqrt{\sum_{j=-2}^{2} w_j\left(\theta_j(k) - \hat{\theta}(k)\right)^2}$$

Advantageously, the weightings $\omega_j$ are defined as follows:

$$\begin{cases} w_0 = \frac{1}{3}, \\ w_j = \frac{1}{6}, \forall\, j = \{-2, -1, 1, 2\} \end{cases}$$

The invention further relates to a method of controlling a wind turbine equipped with a LiDAR sensor. This method comprises steps of:

a) determining the wind direction upstream from the wind turbine by use of the method according to one of the above features; and b) controlling the wind turbine according to the wind direction upstream from the wind turbine.

Furthermore, the invention relates to a computer program product comprising code instructions for carrying out steps of a method according to one of the above features, when the program is executed on a processing unit of the LiDAR sensor.

Moreover, the invention relates to a LiDAR sensor for a wind turbine comprising a processing unit implementing a method according to any one of the above features.

The invention also relates to a wind turbine comprising a LiDAR sensor according to any one of the above features with the LiDAR sensor being preferably on the nacelle of the wind turbine or in a hub of the wind turbine.

BRIEF DESCRIPTION OF THE DRAWINGS

Other features and advantages of the method according to the invention will be clear from reading the description hereafter of embodiments given by way of non-limitative example, with reference to the accompanying drawings wherein:

FIG. 1 illustrates a wind turbine equipped with a LiDAR sensor according to an embodiment of the invention;

FIG. 2 illustrates steps of the method of determining the wind direction according to an embodiment of the invention;

FIG. 3 illustrates a longitudinal component of the wind speed as a function of time for an example embodiment;

FIG. 4 illustrates the transverse component of the wind speed as a function of time for the example of FIG. 3; and FIG. 5 illustrates the wind direction as a function of time for the example of FIGS. 3 and 4, by use of an embodiment of the method according to the invention and by use of a Monte Carlo method.

DETAILED DESCRIPTION OF THE INVENTION

The present invention relates to a method of determining the wind direction by use of a LiDAR sensor. The wind direction is understood to be the angle formed by the direction of the wind with respect to the measurement direction of the LiDAR sensor. The measurement direction of the LiDAR sensor is also referred to as longitudinal direction.

According to the invention, the LiDAR sensor allows to measure the wind speed over at least one measurement plane upstream from the wind turbine, with respect to the wind circulation. There are several types of LiDAR sensors, for example scanning LiDAR sensors, continuous wave or pulsed LiDAR sensors. Within the context of the invention, a pulsed LiDAR is preferably used. However, the other LiDAR technologies may also be used while remaining within the scope of the invention.

LiDAR sensors provide fast measurement. Therefore, using such a sensor enables fast, continuous and real-time determination of the wind direction. For example, the sampling rate of the LiDAR sensor can range between 1 and 5 Hz (or more in the future), and it can be 4 Hz. Furthermore, the LiDAR sensor allows obtaining information relative to the wind upstream from the turbine, that is information relative to the wind coming towards the turbine. The LiDAR sensor can therefore be used for determining the wind direction.

FIG. 1 schematically shows, by way of non-limiting example, a horizontal-axis wind turbine 1 equipped with a LiDAR sensor 2 for the method according to an embodiment of the invention. LiDAR sensor 2 is used to measure the wind speed at a given distance over measurement planes PM (only two measurement planes are shown). Knowing the wind measurement in advance a priori allows providing substantial information. This figure also shows axes x, y and z. The reference point of this coordinate system is the center of the rotor. Direction x is the longitudinal direction corresponding to the direction of the rotor axis, upstream from the wind turbine, this direction also corresponds to the measurement direction of LiDAR sensor 2. Direction y, perpendicular to direction x, is the lateral direction located in a horizontal plane (directions x, y form a horizontal plane). Direction z is the vertical direction (substantially corresponding to the direction of tower 4) pointing up, axis z is perpendicular to axes x and y. The rotor plane is indicated by the rectangle in dotted line PR, it is defined by directions y, z for a zero value of x. Measurement planes PM are planes formed by directions y, z at a distance from rotor plane PR (for a non-zero value of x). Measurement planes PM are parallel to rotor plane PR.

Conventionally, a wind turbine 1 converts the kinetic energy of the wind into electrical or mechanical energy. For conversion of wind energy to electrical energy, the following elements are used:

a tower 4 allowing a rotor (not shown) to be positioned at a sufficient height to at least one of enabling motion thereof (necessary for horizontal-axis wind turbines) and allowing the rotor to be positioned at a height enabling it to be driven by a stronger and more regular wind than at ground level 6. Tower 4 generally houses part of the electrical and electronic components (modulator, control, multiplier, generator, etc.);

a nacelle 3 mounted at the top of tower 4, housing mechanical, pneumatic and some electrical and electronic components (not shown) necessary for operating the machine. Nacelle 3 can rotate to orient the machine (the rotor) in the right direction;

the rotor, fastened to the nacelle, comprising blades 7 (generally three) and the hub of the wind turbine. The rotor is driven by the energy from the wind and it is connected by a mechanical shaft, directly or indirectly (via a gearbox and mechanical shaft system), to an electrical machine (electrical generator) (not shown) that converts the energy recovered to electrical energy. The rotor is potentially provided with control systems such as a variable-angle blade or aerodynamic brake control systems, a transmission having two shafts (mechanical shaft of the rotor and mechanical shaft of the electrical machine) connected by a transmission (gearbox) (not shown).

As is visible in FIG. 1, which is an example embodiment of a pulsed LiDAR sensor, the LiDAR sensor 2 comprises four beams or measurement axes (b1, b2, b3, b4). By way of non-limitative example, the method according to the invention also works with a LiDAR sensor comprising any number of beams. The LiDAR sensor performs a punctual measurement at each measurement point (PT1, PT2, PT3, PT4), which are points of intersection of a measurement plane PM and a beam (b1, b2, b3, b4). These measurement points (PT1, PT2, PT3, PT4) are represented by black circles in FIG. 1. Processing the measurements at these measurement points (PT1, PT2, PT3, PT4) allows determining the wind speed in measurement planes PM at several heights with measurement points PT1 and PT2 being located at a greater height than measurement points PT3 and PT4.

Preferably, LiDAR sensor 2 can be mounted on nacelle 3 of wind turbine 1, in the hub of wind turbine 1 or directly in blades 7.

According to the invention, the method of determining the wind direction by use of a LiDAR sensor comprises steps of:

1) measuring wind speed;
2) determining the longitudinal and transverse components of the wind speed; and
3) determining the wind direction.

These steps are carried out in real time. The steps are described in detail in the rest of the description hereafter.

FIG. 2 schematically illustrates, by way of non-limitative example, the steps of the method of determining the wind direction according to an embodiment of the invention. The first step is a step (MES) of measuring the wind by use of the LiDAR sensor. The wind field is then reconstructed (REC) in order to determine the Gaussian distribution of the longitudinal u and transverse v components of the wind speed. Finally, by use of a spherical cubature approximation method (ACS), the wind direction $\theta$ is determined from the Gaussian distribution of the longitudinal u and transverse v components of the wind speed.

1. Wind Speed Measurement

In this step, the wind speed is continuously measured in at least one measurement plane distant from the wind turbine, by use of the LiDAR sensor, at least at two measurement points. The LiDAR sensor can allow the radial speed to be measured: along the axis of each measurement beam of the LiDAR sensor (corresponding to beams b1 to b4 of FIG. 1). Thus, the wind speed can be known upstream from the wind turbine in at least one measurement plane.

According to an implementation of the invention, the measurement planes can be at a longitudinal distance (along axis x in FIG. 1) preferably ranging between 50 and 400 m from the rotor plane. It is thus possible to determine the evolution of the wind speed over a long distance upstream from the wind turbine, which also allows increasing the precision in determining the wind direction.

Alternatively, the measurement planes may be closer or further away than the preferred range.

According to a non-limitative example embodiment, the LiDAR sensor can perform measurements for ten measurement planes, which can notably be located at distances of 50, 70, 90, 100, 110, 120, 140, 160, 180 and 200 m from the rotor plane respectively.

1. Determination of the Longitudinal and Transverse Components of the Wind Speed This step determines a Gaussian distribution of the longitudinal and transverse components of the wind speed using the measurements of step 1). In other words, the radial wind speed measurements performed by the LiDAR sensor are converted to longitudinal and transverse components. The longitudinal component corresponds to the measurement direction of the LiDAR sensor (direction x in FIG. 1), and the transverse component corresponds to a direction perpendicular to the measurement direction of the LiDAR sensor, i.e. a direction parallel to axis y of FIG. 1.

According to an embodiment of the invention, the wind field can be reconstructed using any known method, notably by projecting the radial speed onto the longitudinal axis or, by use of non-limitative example, a wind field estimator can notably be applied, which can notably correspond to the wind modelling method described in French patent application FR-3,068,139 (WO-2018/234,409), whose main steps are reminded hereafter:

- gridding the space located upstream from the LiDAR sensor, the grid comprising estimation points and measurement points;
- measuring the wind amplitude and direction at the various measurement points;
- estimating the wind amplitude and direction at any time for all of the estimation points using a recursive least-squares method of a cost function; and
- reconstructing the incident wind field in three dimensions and in real time over all of the discretized points.

The estimated longitudinal and transverse components of the wind speed, obtained by use of any known method, can be denoted by u(k) and v(k). Vector $[u(k)\ v(k)]^T$ is a random variable following a Gaussian distribution with mean $[\hat{u}(k)\ \hat{v}(k)]^T$ and the positive definite covariance matrix P(k) (covariance matrix P(k) characterizes the amount of noise in the estimated wind speeds). We can then state:

$$\begin{bmatrix} u(k) \\ v(k) \end{bmatrix} \sim \mathcal{N}\left(\begin{bmatrix} \hat{u}(k) \\ \hat{v}(k) \end{bmatrix}, P(k)\right)$$

with $\mathcal{N}$ being the Gaussian distribution. The mean and the covariance matrix are available at any time since they are outputs of the wind field reconstruction, in particular for the method described in patent application FR-3,068,139 (WO-2018/234,409).

3) Determination of the Wind Direction

This step determines in real time the wind direction by use of a spherical cubature approximation method applied to the Gaussian distribution of the longitudinal and transverse components of the wind speed obtained in step 2. A spherical cubature approximation method is a numerical method allowing approximating a distribution of random variables with a limited number of points (that is with a limited number of stochastic realizations). Such a method is notably described in the document: I. Arasaratnam, "Cubature Kalman filtering theory & applications", Ph.D. dissertation, 2009. The spherical cubature approximation method allows determining the wind direction in real time because it does not require a substantial mention of calculations and it involves no complex calculations. The Monte Carlo method is not suitable for real-time estimation problems due to the significant computing time required by the number of calculations and the complexity of the calculations.

Furthermore, this step uses the following equation that defines the angle θ of the wind direction:

$$\theta = \arctan\left(\frac{v}{u}\right),$$

with u being the longitudinal component of the wind speed and v being the transverse component of the wind speed.

According to an embodiment of the invention, the standard deviation of the wind direction can also be determined in this step. It is thus possible to determine the robustness of the wind direction determination.

According to an implementation of the invention, the spherical cubature approximation method can be implemented for five stochastic realizations from the Gaussian distribution of the longitudinal and transverse components of the wind speed.

The number of calculations is thus limited, which allows this step to be carried out in real time. Furthermore, this number of stochastic realizations provides reliability of the wind direction determination through the spherical cubature approximation method.

According to an embodiment of the invention, the wind direction can be determined by use of the spherical cubature approximation method by carrying out the following steps:

i) determining stochastic realizations (five stochastic realizations for example) of the Gaussian distribution of the longitudinal $u_j$ and transverse $v_j$ components of the wind speed, j ranging from −2 to 2, in such a way that:

$$\begin{cases} \begin{bmatrix} u_0(k) \\ v_0(k) \end{bmatrix} = \begin{bmatrix} \hat{u}(k) \\ \hat{v}(k) \end{bmatrix}, \\ \begin{bmatrix} u_{\pm 1}(k) \\ v_{\pm 1}(k) \end{bmatrix} = \begin{bmatrix} \hat{u}(k) \\ \hat{v}(k) \end{bmatrix} \pm \sqrt{2}\delta_1 S_1, \\ \begin{bmatrix} u_{\pm 2}(k) \\ v_{\pm 2}(k) \end{bmatrix} = \begin{bmatrix} \hat{u}(k) \\ \hat{v}(k) \end{bmatrix} \pm \sqrt{2}\delta_2 S_2, \end{cases}$$

with $$\Sigma = \begin{bmatrix} \delta_1^2 & 0 \\ 0 & \delta_2^2 \end{bmatrix},$$

$$P(k) = S\Sigma S^T,$$

$$P(k) = \delta_1^2 S_1 S_1^T + \delta_2^2 S_2 S_2^T,$$

û and v̂ are the estimated values of u and v, P(k) is the covariance matrix of the Gaussian distribution of the longitudinal and transverse components of the wind speed, S and Σ are the matrices obtained from the singular value decomposition of covariance matrix P(k), and $S_1$ and $S_2$ are the columns of matrix S, ii) for each stochastic realization j (j ranging from −2 to 2), determining wind direction $\theta_j$ by use of the equation:

$$\theta_j(k) = \arctan\left(\frac{v_j(k)}{u_j(k)}\right),$$

and iii) determining wind direction $\hat{\theta}$ by use of the equation:

$$\hat{\theta}(k) = \sum_{j=-2}^{2} w_j \theta_j(k),$$

with $\omega_j$ being weightings of the stochastic realizations (in other words, the wind direction is determined by use of a weighted average of the wind directions obtained for each stochastic realization).

This embodiment allows fast and simple wind direction determination.

For the embodiment where standard deviation $\hat{\sigma}$ of wind direction $\hat{\theta}$ is also determined, the following equation can be used:

$$\hat{\sigma}(k) = \sqrt{\sum_{j=-2}^{2} w_j \left(\theta_j(k) - \hat{\theta}(k)\right)^2}$$

According to a non-limitative example embodiment, weightings $\omega_j$ can be determined by means of the following equations:

$$\begin{cases} w_0 = \frac{1}{3}, \\ w_j = \frac{1}{6}, \forall j = \{-2, -1, 1, 2\}. \end{cases}$$

These weightings provide robust determination of the wind direction and, possibly, of the wind direction standard deviation.

Alternatively, other weightings can be implemented.

The present invention also relates to a method of controlling a wind turbine equipped with a LiDAR sensor. The following steps can be carried out for this method:

determining the wind direction upstream from the wind turbine by use of the method of determining the wind direction according to any one of the variants or variant combinations described above; and controlling the wind turbine according to the wind direction upstream from the wind turbine.

Precise real-time prediction of the wind direction upstream from the wind turbine allows suitable wind turbine control in terms of minimization of the effects on the turbine structure and maximization of the recovered power. Indeed, this control allows anticipating the direction of the wind coming towards the turbine by of these predictions and thus to adapt the turbine equipments with a phase lead so that it is in the optimum configuration for this wind when the estimated wind reaches the turbine. Besides, the LiDAR sensor allows reducing the burden on the structure, the blades and the tower representing about 54% of the cost. Using a LiDAR sensor therefore allows optimizing the wind turbine structure and to reduce the costs and maintenance.

According to an implementation of the invention, the inclination angle of at least one of blades and the electrical recovery torque of the wind turbine generator can be controlled depending on the wind speed and at least one of the wind direction and the orientation of the nacelle. Preferably, the individual inclination angle of the blades can be controlled. Other types of regulation devices can be used. Controlling the blade inclination allows to optimize energy recovery according to the incident wind on the blades.

According to an embodiment of the invention, the inclination angle of at least one of the blades and the electrical recovery torque can be determined by of wind turbine maps as a function of the wind speed at the rotor. For example, the control method described in French patent application FR-2,976,630 A1 corresponding to US 2012-0,321,463 can be applied.

The present invention further relates to at least one of a method for monitoring and diagnosis of a wind turbine equipped with a LiDAR sensor. The following steps can be carried out for this method:

determining the wind direction upstream from the wind turbine by use of the method of determining the wind direction according to any one of the above variants or variant combinations; and at least one of monitoring and diagnosing the operation of the wind turbine according to the wind direction upstream from the turbine.

Monitoring and/or diagnosis can for example correspond to the mechanical strain undergone by the structure of the wind turbine according to the wind direction.

Furthermore, the invention relates to a computer program product comprising code instructions designed to carry out the steps of one of the methods described above (method of determining the wind direction, control method). The program is executed on a processing unit of the LiDAR sensor or any similar processing unit related to the LiDAR sensor or to the wind turbine.

According to an aspect, the present invention also relates to a LiDAR sensor for a wind turbine, comprising a processing unit configured to implement one of the methods described above (method of determining the wind direction, control method).

According to an implementation of the invention, the LiDAR sensor can be a scanning LiDAR sensor, a continuous wave LiDAR sensor or a pulsed LiDAR sensor. The LiDAR sensor is preferably a pulsed LiDAR sensor.

The invention also relates to a wind turbine, notably an offshore (at sea) or an onshore (on land) wind turbine equipped with a LiDAR sensor as described above. According to an embodiment of the invention, the LiDAR sensor can be arranged on the nacelle of the wind turbine or in the hub of the turbine. The LiDAR sensor is so oriented to perform a measurement of the wind upstream from the turbine (that is before the wind turbine and along the longitudinal axis thereof, designated by axis x in FIG. 1). According to an embodiment, the wind turbine can be identical to the wind turbine illustrated in FIG. 1.

For the embodiment of the control method, the wind turbine can comprise a control, for example for control of the inclination angle (or pitch angle) of at least one blade of the wind turbine or of the electrical torque, for implementing the control method according to the invention.

It is clear that the invention is not limited to the embodiments of the methods described above by way of example and that it encompasses any variant embodiment.

Example

The features and advantages of the method according to the invention will be clear from reading the application example hereafter.

The example uses a four-beam pulsed LiDAR sensor arranged on a nacelle of a wind turbine whose hub height is 83 m above the ground, with a rotor diameter of 80 m. The LiDAR sensor measures the radial wind speed, denoted by RWS, upstream from the turbine. The radial wind speeds are measured in measurement planes located 50, 70, 90, 100, 120, 140, 150, 170, 190 and 200 m upstream from the wind turbine.

These measurements are fed to the wind field estimator as described in French patent application FR-3,068,139 (WO-2018/234,409). Thus, the longitudinal and transverse components of the wind speeds of the three-dimensional field can be obtained with their covariance matrix, which characterizes the amount of noise in the estimated wind speeds.

FIGS. 3 and 4 respectively illustrate the longitudinal u and transverse v components in m/s as a function of time T in s, for one of the beams of the LiDAR sensor in a measurement plane located 200 m away. FIGS. 3 and 4 correspond to one day of measurement.

For this example, the method of determining the wind direction in real time is compared with a method of determining the wind direction of the prior art, based on the Monte Carlo method, which cannot be implemented in real time due to the considerable number of calculations required and to the complexity of these calculations, involving a significant computing time.

FIG. 5 shows, by way of example, the wind direction θ in degrees as a function of time T in s, for the embodiment according to the invention denoted by INV and for an embodiment of the prior art based on the Monte Carlo method, denoted by MCA. It is noted that the two curves are superimposed. Therefore, although the method according to the invention involves less calculations than the method of the prior art, it provides a result accuracy equivalent to that of a complete and complex method.

The invention claimed is:

1. A method for determining a wind direction by use of a LiDAR sensor arranged on a wind turbine, comprising steps of:
  a) performing wind measurements by use of the LiDAR sensor in at least one measurement plane upstream from the wind turbine, the measurement plane being perpendicular to a measurement direction of the LiDAR sensor;
  b) determining a Gaussian distribution of longitudinal and transverse components of wind speed by use of the measurements, the longitudinal component corresponding to the measurement direction of LiDAR sensor, and the transverse component corresponding to a direction perpendicular to the measurement direction of LiDAR sensor; and
  c) determining in real time a wind direction by use of the determined Gaussian distribution of the longitudinal and transverse components of the wind speed through a spherical cubature approximation method.

2. The method of determining the wind direction as claimed in claim 1, wherein the Gaussian distribution of the longitudinal and transverse components of the wind speed is determined by use of a wind field estimator.

3. The method of determining the wind direction as claimed in claim 1, wherein the method further comprises determining a standard deviation of the wind direction.

4. The method of determining the wind direction as claimed in claim 2, wherein the method further comprises determining a standard deviation of the wind direction.

5. The method of determining the wind direction as claimed in claim 1, wherein the spherical cubature approximation involves five stochastic realizations from the Gaussian distribution of the longitudinal and transverse components of the wind speed.

6. The method of determining the wind direction as claimed in claim 2, wherein the spherical cubature approximation involves five stochastic realizations from the Gaussian distribution of the longitudinal and transverse components of the wind speed.

7. The method of determining the wind direction as claimed in claim 3, wherein the spherical cubature approximation involves five stochastic realizations from the Gaussian distribution of the longitudinal and transverse components of the wind speed.

8. The method of determining the wind direction as claimed in claim 4, wherein the spherical cubature approximation involves five stochastic realizations from the Gaussian distribution of the longitudinal and transverse components of the wind speed.

9. The method of determining the wind direction as claimed in claim 1, wherein the wind direction is determined by use of the spherical cubature approximation method by carrying out steps of:
  i) determining stochastic realizations of the Gaussian distribution of the longitudinal $u_j$ and transverse $v_j$ components of the wind speed, with j ranging from −2 to 2, so that:

$$\begin{cases} \begin{bmatrix} u_0(k) \\ v_0(k) \end{bmatrix} = \begin{bmatrix} \hat{u}(k) \\ \hat{v}(k) \end{bmatrix}, \\ \begin{bmatrix} u_{\pm 1}(k) \\ v_{\pm 1}(k) \end{bmatrix} = \begin{bmatrix} \hat{u}(k) \\ \hat{v}(k) \end{bmatrix} \pm \sqrt{2}\delta_1 S_1, \\ \begin{bmatrix} u_{\pm 2}(k) \\ v_{\pm 2}(k) \end{bmatrix} = \begin{bmatrix} \hat{u}(k) \\ \hat{v}(k) \end{bmatrix} \pm \sqrt{2}\delta_2 S_2 \end{cases}$$

with $$\Sigma = \begin{bmatrix} \delta_1^2 & 0 \\ 0 & \delta_2^2 \end{bmatrix},$$

$$P(k) = S\Sigma S^T,$$

$$P(k) = \delta_1^2 S_1 S_1^T + \delta_2^2 S_2 S_2^T,$$

$\hat{u}$ and $\hat{v}$ being the estimated values of u and v, P(k) being the covariance matrix of the Gaussian distribution, S and $\Sigma$ being the matrices obtained from the singular value decomposition of covariance matrix P(k), $S_1$ and $S_2$ being the columns of matrix S,
  ii) for each stochastic realization j, determining wind direction $\theta_j$ by use of the following equation:

$$\theta_j(k) = \arctan\left(\frac{v_j(k)}{u_j(k)}\right),$$

and
  iii) determining wind direction $\hat{\theta}$ by use of the following equation:

$$\hat{\theta}(k) = \sum_{j=-2}^{2} w_j \theta_j(k),$$

with $\omega_j$ weightings of the stochastic realizations.

10. The method of determining the wind direction as claimed in claim 2, wherein the wind direction is determined by use of the spherical cubature approximation method by carrying out steps of:
  i) determining stochastic realizations of the Gaussian distribution of the longitudinal $u_j$ and transverse $v_j$ components of the wind speed, with j ranging from $-2$ to 2, so that:

$$\begin{cases} \begin{bmatrix} u_0(k) \\ v_0(k) \end{bmatrix} = \begin{bmatrix} \hat{u}(k) \\ \hat{v}(k) \end{bmatrix}, \\ \begin{bmatrix} u_{\pm 1}(k) \\ v_{\pm 1}(k) \end{bmatrix} = \begin{bmatrix} \hat{u}(k) \\ \hat{v}(k) \end{bmatrix} \pm \sqrt{2}\,\delta_1 S_1, \\ \begin{bmatrix} u_{\pm 2}(k) \\ v_{\pm 2}(k) \end{bmatrix} = \begin{bmatrix} \hat{u}(k) \\ \hat{v}(k) \end{bmatrix} \pm \sqrt{2}\,\delta_2 S_2 \end{cases}$$

with $$\Sigma = \begin{bmatrix} \delta_1^2 & 0 \\ 0 & \delta_2^2 \end{bmatrix},$$

$$P(k) = S\Sigma S^T,$$

$$P(k) = \delta_1^2 S_1 S_1^T + \delta_2^2 S_2 S_2^T,$$

$\hat{u}$ and $\hat{v}$ being the estimated values of u and v, P(k) being the covariance matrix of the Gaussian distribution, S and $\Sigma$ being the matrices obtained from the singular value decomposition of covariance matrix P(k), $S_1$ and $S_2$ being the columns of matrix S,
  ii) for each stochastic realization j, determining wind direction $\theta_j$ by use of the following equation:

$$\theta_j(k) = \arctan\left(\frac{v_j(k)}{u_j(k)}\right),$$

and
  iii) determining wind direction $\hat{\theta}$ by use of the following equation:

$$\hat{\theta}(k) = \sum_{j=-2}^{2} w_j \theta_j(k),$$

with $\omega_j$ weightings of the stochastic realizations.

11. The method of determining the wind direction as claimed in claim 3, wherein the wind direction is determined by use of the spherical cubature approximation method by carrying out steps of:
  i) determining stochastic realizations of the Gaussian distribution of the longitudinal $u_j$ and transverse $v_j$ components of the wind speed, with j ranging from $-2$ to 2, so that:

$$\begin{cases} \begin{bmatrix} u_0(k) \\ v_0(k) \end{bmatrix} = \begin{bmatrix} \hat{u}(k) \\ \hat{v}(k) \end{bmatrix}, \\ \begin{bmatrix} u_{\pm 1}(k) \\ v_{\pm 1}(k) \end{bmatrix} = \begin{bmatrix} \hat{u}(k) \\ \hat{v}(k) \end{bmatrix} \pm \sqrt{2}\,\delta_1 S_1, \\ \begin{bmatrix} u_{\pm 2}(k) \\ v_{\pm 2}(k) \end{bmatrix} = \begin{bmatrix} \hat{u}(k) \\ \hat{v}(k) \end{bmatrix} \pm \sqrt{2}\,\delta_2 S_2 \end{cases}$$

with $$\Sigma = \begin{bmatrix} \delta_1^2 & 0 \\ 0 & \delta_2^2 \end{bmatrix},$$

$$P(k) = S\Sigma S^T,$$

$$P(k) = \delta_1^2 S_1 S_1^T + \delta_2^2 S_2 S_2^T,$$

$\hat{u}$ and $\hat{v}$ being the estimated values of u and v, P(k) being the covariance matrix of the Gaussian distribution, S and $\Sigma$ being the matrices obtained from the singular value decomposition of covariance matrix P(k), $S_1$ and $S_2$ being the columns of matrix S,
  ii) for each stochastic realization j, determining wind direction $\theta_j$ by use of the following equation:

$$\theta_j(k) = \arctan\left(\frac{v_j(k)}{u_j(k)}\right),$$

and
  iii) determining wind direction $\hat{\theta}$ by use of the following equation:

$$\hat{\theta}(k) = \sum_{j=-2}^{2} w_j \theta_j(k),$$

with $\omega_j$ weightings of the stochastic realizations.

12. The method of determining the wind direction as claimed in claim 4, wherein the wind direction is determined by use of the spherical cubature approximation method by carrying out steps of:
  i) determining stochastic realizations of the Gaussian distribution of the longitudinal $u_j$ and transverse $v_j$ components of the wind speed, with j ranging from $-2$ to 2, so that:

$$\begin{cases} \begin{bmatrix} u_0(k) \\ v_0(k) \end{bmatrix} = \begin{bmatrix} \hat{u}(k) \\ \hat{v}(k) \end{bmatrix}, \\ \begin{bmatrix} u_{\pm 1}(k) \\ v_{\pm 1}(k) \end{bmatrix} = \begin{bmatrix} \hat{u}(k) \\ \hat{v}(k) \end{bmatrix} \pm \sqrt{2}\,\delta_1 S_1, \\ \begin{bmatrix} u_{\pm 2}(k) \\ v_{\pm 2}(k) \end{bmatrix} = \begin{bmatrix} \hat{u}(k) \\ \hat{v}(k) \end{bmatrix} \pm \sqrt{2}\,\delta_2 S_2 \end{cases}$$

with $$\Sigma = \begin{bmatrix} \delta_1^2 & 0 \\ 0 & \delta_2^2 \end{bmatrix},$$

$$P(k) = S\Sigma S^T,$$

$$P(k) = \delta_1^2 S_1 S_1^T + \delta_2^2 S_2 S_2^T,$$

$\hat{u}$ and $\hat{v}$ being the estimated values of u and v, P(k) being the covariance matrix of the Gaussian distribution, S and $\Sigma$ being the matrices obtained from the singular value decomposition of covariance matrix P(k), $S_1$ and $S_2$ being the columns of matrix S,
  ii) for each stochastic realization j, determining wind direction $\theta_j$ by use of the following equation:

$$\theta_j(k) = \arctan\left(\frac{v_j(k)}{u_j(k)}\right),$$

and
  iii) determining wind direction $\hat{\theta}$ by use of the following equation:

$$\hat{\theta}(k) = \sum_{j=-2}^{2} w_j \theta_j(k),$$

with $\omega_j$ weightings of the stochastic realizations.

13. The method of determining the wind direction as claimed in claim 3, wherein the standard deviation S of the wind direction $\hat{\theta}$ is determined by use of the following equation:

$$\hat{\sigma}(k) = \sqrt{\sum_{j=-2}^{2} w_j \left(\theta_j(k) - \hat{\theta}(k)\right)^2}.$$

14. The method of determining the wind direction as claimed in claim 4, wherein the standard deviation $\hat{\sigma}$ of the wind direction $\hat{\theta}$ is determined by use of the following equation:

$$\hat{\sigma}(k) = \sqrt{\sum_{j=-2}^{2} w_j \left(\theta_j(k) - \hat{\theta}(k)\right)^2}.$$

15. The method of determining the wind direction as claimed in claim 9, wherein the weightings $\omega_j$ are defined as follows:

$$\begin{cases} w_0 = \dfrac{1}{3}, \\ w_j = \dfrac{1}{6}, \forall j = \{-2, -1, 1, 2\} \end{cases}.$$

16. A method of controlling a wind turbine equipped with a LiDAR sensor, comprising steps of:
   a) determining a wind direction upstream from the wind turbine by use of the method of claim 1; and
   b) controlling the wind turbine according to the wind direction upstream from the wind turbine.

17. A computer program product, comprising a non-transient computer-readable medium comprising code instructions, which, when executed by a processing unit of a LiDAR sensor, carry out the steps of the method of claim 1.

18. A LiDAR sensor for a wind turbine, comprising a processing unit implementing the method of claim 1.

19. A wind turbine, comprising the LiDAR sensor of claim 18, wherein the LiDAR sensor is on a nacelle of the wind turbine or in a hub of the wind turbine.

* * * * *